(12) United States Patent
Andersson

(10) Patent No.: US 9,825,520 B2
(45) Date of Patent: Nov. 21, 2017

(54) CURRENT-LIMITING CIRCUIT

(71) Applicant: Telefonaktiebolaget LM Ericsson (publ), Stockholm (SE)

(72) Inventor: Mattias Andersson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/028,020

(22) PCT Filed: Oct. 22, 2013

(86) PCT No.: PCT/EP2013/072046
§ 371 (c)(1),
(2) Date: Apr. 7, 2016

(87) PCT Pub. No.: WO2015/058789
PCT Pub. Date: Apr. 30, 2015

(65) Prior Publication Data
US 2016/0254741 A1  Sep. 1, 2016

(51) Int. Cl.
*G05F 1/569* (2006.01)
*H02M 1/32* (2007.01)
(Continued)

(52) U.S. Cl.
CPC .............. *H02M 1/32* (2013.01); *G05F 1/573* (2013.01); *H02M 2001/0009* (2013.01)

(58) Field of Classification Search
CPC . G05F 1/56; G05F 1/575; G05F 1/565; G05F 1/569; H02M 3/125; H02M 3/135;
(Continued)

(56) References Cited

U.S. PATENT DOCUMENTS 5,550,702 A   8/1996   Schmidt et al.
7,408,755 B1  8/2008   Ye et al.
(Continued)

FOREIGN PATENT DOCUMENTS

EP    2562896 A2    2/2013

OTHER PUBLICATIONS

International Search Report, Application No. PCT/EP2013/072046, dated Jun. 23, 2014, 3 pages.
(Continued)

*Primary Examiner* — Adolf Berhane
(74) *Attorney, Agent, or Firm* — NDWE LLP

(57) ABSTRACT

A current-limiting circuit that includes a transistor connected between an input terminal and an output terminal of the current-limiting circuit. A controller is arranged to monitor a current flowing through the transistor and to control the transistor based on the monitored current so as to limit the current, wherein a voltage dropped across the transistor varies over a range of values during operation in a current-limiting mode. The controller includes a timing module arranged to control, based on a value of the voltage across the transistor, a period of time for which the transistor limits the current. For all ranges of voltage that may be dropped across the transistor during the current-limiting mode, the timing module is arranged to control the respective period of time for each range, such that the transistor dissipates substantially the maximum amount of energy that it is capable of dissipating without sustaining damage.

13 Claims, 10 Drawing Sheets

(51) Int. Cl.
*G05F 1/573* (2006.01)
*H02M 1/00* (2006.01)

(58) Field of Classification Search
CPC ...... H02M 3/145; H02M 3/155; H02M 3/156;
H02M 3/157; H02M 2003/1566
USPC ....... 323/265, 273, 275, 276, 282, 283, 285,
323/351
See application file for complete search history.

(56) References Cited

U.S. PATENT DOCUMENTS

| | | | | |
|---|---|---|---|---|
| 7,570,497 | B2* | 8/2009 | Jacques | H02M 3/33507 363/21.03 |
| 9,444,248 | B2* | 9/2016 | Erhart | H02H 9/025 |
| 2002/0196004 | A1* | 12/2002 | Berson | H02H 9/001 323/282 |
| 2003/0161082 | A1 | 8/2003 | Rampold et al. | |
| 2008/0037293 | A1* | 2/2008 | Jacques | H02M 3/33553 363/21.03 |
| 2013/0321076 | A1* | 12/2013 | Galbis | H03F 1/0216 330/127 |

OTHER PUBLICATIONS

"Positive High-Voltage Power-Limiting Hotswap Controller," SLVS503D, Nov. 2003, Revised Jul. 2012, 24 pages, TPS2490, TPS2491, Texas Instruments Incorporated.
"Negative Hot Swap / Inrush Current Controller with Power Limiting," SNVS532C, Oct. 2007, Revised Mar. 2013, 35 pages, LM5067, Texas Instruments Incorporated.
"-48 V Hot Swap Controller and Digital Power Monitor with PMBus Interface," 2011-2013, 52 pages, Data Sheet ADM1075, Analog Devices, Inc.
"Negative Voltage Hot Swap Controllers," 2012, 36 pages, LTC4252B-1/LTC4252B-2, LTC4252C-1/LTC4252C-2, Linear Technology Corporation.
International Preliminary Report on Patentability for International Application No. PCT/EP2013/072046, dated May 6, 2016, 8 pages.

* cited by examiner

CURRENT-LIMITING CIRCUIT

CROSS-REFERENCE TO RELATED APPLICATIONS

This application is a National stage of International Application No. PCT/EP2013/072046, filed Oct. 22, 2013, which is hereby incorporated by reference.

TECHNICAL FIELD

The present invention generally relates to the field of current-limiting circuits (also widely known as "hot swap circuits" or "inrush current limiters") comprising a current-limiting transistor, and more specifically to schemes of controlling the transistor to limit an inrush current that may arise upon connecting the current-limiting circuit to a live backplane or in response to an input voltage transient, for example.

BACKGROUND

The need for current limitation arises in many applications, for example to provide protection for so-called "hot swap" or "hot plug" components that a user can connect to a computer system without interrupting its operation. For example, the need for inrush current limitation often arises in plug-in integrated circuit boards such as telecoms/datacoms plug-in boards, which need to be safely connected to a live backplane such as a 48 V bus. As the input capacitors that are normally provided on plug-in boards can draw a high transient current from the backplane as they charge up, charging of these capacitors needs to be current-limited in order to avoid various undesirable consequences of the high transient current, such as a dip in the backplane voltage, damage to connectors, traces or other components in the board's circuitry, or the tripping of circuit breakers in any other boards that may be connected to the backplane. Current limitation may also be required to avoid excessive inrush currents caused by input voltage transients that may occur after the board has been connected to the backplane. The structure and operation of a conventional current-limiting circuit that provides these protective functions will now be explained with reference to FIG. 1.

FIG. 1 is a schematic illustration of a plug-in board 100 having a conventional current-limiting circuit 200 that serves to connect a live backplane 300 to load circuitry that is provided, by way of example, in the form of an isolated DC/DC converter module 400 and down-stream low-voltage circuitry 500. The input capacitance of the load circuitry is represented by the input capacitor $C_{in}$ that is connected between the inputs of the DC-DC converter module 400. In the present example, the current-limiting component in the current-limiting circuit 200 is a transistor Q1, which is connected in series with a current sense resistor $R_s$ between an input terminal 210 of the current-limiting circuit 200 and an output terminal 220 of the current-limiting circuit 200, so as to provide a current path between the terminals 210 and 220 when turned ON. In the present example, the transistor Q1 is provided in the form of a power metal-oxide-semiconductor field-effect transistor (MOSFET), although another type of transistor, such as an insulated gate bipolar transistor (IGBT), may alternatively be used.

The switching and the ON-state channel resistance of transistor Q1 are controlled by the hot swap controller 230, which is arranged to monitor the transistor's drain-source current $I_{DS}$ (by monitoring the voltage across the current sense resistor $R_s$) and is operable in a current-limiting mode to limit the transistor's drain-source current (hereafter also referred to as the transistor current) when it reaches a prescribed value of $I_{DSmax}$. The controller 230 limits $I_{DS}$ using a feedback control mechanism therein to control the gate of transistor Q1 based on the monitored current so as to keep $I_{DS}$ below the prescribed value of $I_{DSmax}$. During current limitation, the voltage across the current-carrying channel of the transistor Q1 will vary across a range of values. For example, upon connecting the plug-in board 100 to the backplane 300, most of the backplane voltage $V_B$ will initially be dropped over the current-limiting transistor Q1, and the voltage across the transistor Q1 will then decrease as the input capacitor $C_{in}$ charges.

During current limitation, the power dissipated by the transistor Q1 could exceed the maximum power $P_{max}$ which the transistor can dissipate without sustaining any damage that would degrade its performance. To protect the transistor Q1 from being damaged in this way, the controller 230 may, as in the present example, enforce a maximum power limit that cannot be exceeded during current limitation, by monitoring the drain-source voltage $V_{DS}$ of the transistor Q1 and controlling the transistor's gate to ensure not only that $I_{DS}$ does not exceed the prescribed value of $I_{DSmax}$ but also that the product of the monitored voltage $V_{DS}$ and the monitored current $I_{DS}$ does not exceed the maximum power $P_{max}$.

More specifically, the controller 230 limits power dissipation by varying the target current value that is used by its feedback control mechanism as the voltage across the transistor changes, such that the power dissipated by the transistor Q1 does not exceed the maximum permitted level of $P_{max}$. Thus, as $V_{DS}$ decreases during operation in the current-limiting mode, the target current value used by the controller's feedback control mechanism increases up to the prescribed value of $I_{DSmax}$ while the power dissipation of the transistor is being limited to $P_{max}$ at higher values of $V_{DS}$. As the voltage across the transistor Q1 decreases further, the target current value is held at $I_{DSmax}$ to ensure that the transistor current $I_{DS}$ remains within safe bounds.

As an additional protective measure, the controller 230 may, as in the present example, allow current limitation to be performed by the transistor Q1 only for a set period of time. After current limitation has been performed for the set period of time (referred to herein as the transistor's "ON time"), the controller 230 turns the transistor Q1 OFF for a period of time in order to allow the transistor Q1 to cool, and this cycle of current-limited conduction followed by cooling may then be repeated until the input capacitor $C_{in}$ has charged sufficiently so that $I_{DS}$ is no longer high enough to cause the controller 230 to operate in the current-limiting mode.

A current-limiting circuit of the type described above (hereafter referred to as "Type 1") is provided in a number of commercially available hot swap controller boards, for example the Texas Instruments LM5067EVAL evaluation board.

A second type of current-limiting circuit (hereafter referred to as "Type 2"), which applies current limitation (but not power limitation, as in the above example) in combination with a variable transistor ON time that decreases with increasing $V_{DS}$ is employed in Linear Technology LTC4252 hot swap controllers, for example.

In a current-limiting circuit of a third type ("Type 3", an example of which is provided in U.S. Pat. No. 7,408,755 B1), current limitation (but not power limitation, as in the first type of current-limiting circuit described above) with a variable transistor ON time is employed during operation in the current-limiting mode. However, in this example, the transistor ON time used during current limitation is set at a fixed value for values of $V_{DS}$ up to a predetermined threshold and, at higher values of $V_{DS}$, decreases as $V_{DS}$ increases.

SUMMARY

The present inventor has examined the transistor control schemes used in existing current-limiting circuits of the types outlined above and realised that, for many transistor voltages $V_{DS}$ that may be encountered during operation in the current-limiting mode, all of these control schemes cause the transistor to dissipate less energy than it is safely capable of dissipating. As a consequence, in cases where the current-limiting circuit connects the backplane to a load with a high input capacitance and thus performs several conduction and cooling cycles during connection as described above, the charging of the input capacitance is unnecessarily slow. Another consequence of failing to fully exploit the transistor's energy dissipating capability is that the transistor tends to be over-dimensioned, thereby increasing manufacture costs and wasting valuable board space. To assist further understanding, the transistor's pulse energy capability will now be explained with reference to FIG. 2.

FIG. 2 illustrates the pulse energy capability of a transistor in the exemplary form of a MOSFET that may be used in current-limiting applications (specifically, the PSMN013-100YSE MOSFET produced by NXP Semiconductors N.V.), which may be determined in a straight-forward way either experimentally or by examining the transistor's Safe Operating Area (SOA) diagram. More specifically, the curve in FIG. 2 shows the maximum amount of energy, $E_{max}$, that the MOSFET can dissipate without sustaining damage as a function of the applied drain-source voltage when a 1 ms voltage pulse is applied to the MOSFET's gate. In this example, in a first voltage region ("voltage region 1"), where $V_{DS}$ is lower than about 40 V, the maximum amount of energy that the MOSFET can dissipate safely (i.e. without sustaining any damage that would have an observable effect on its performance) is about 900 mJ, regardless of the value of $V_{DS}$. However, in a second voltage region ("voltage region 2"), where $V_{DS}$>40 V, $E_{max}$ decreases with increasing $V_{DS}$, as shown in FIG. 2. This decrease of $E_{max}$ at higher values of $V_{DS}$ is caused by the MOSFET entering a regime of positive feedback, where a temperature-dependent shift in the MOSFET's threshold voltage causes its channel resistance to exhibit a positive temperature coefficient; this causes resistive heating of the MOSFET to increase $I_{DS}$ for a given value of $V_{DS}$, thereby further heating the MOSFET and potentially leading to thermal runaway. The behaviour of the MOSFET in voltage region 2 depends on the transient thermal impedance of the MOSFET, which varies with the pulse duration. However, the inventor has realised that, for the time scales of interest in inrush current-limiting applications (typically from about 0.5 ms to 2 ms), the pulse energy capability curve for a 1 ms pulse, as shown in FIG. 2, provides a good indication of $E_{max}$ as a function of $V_{DS}$ for all of the transistor conduction times that may be used by the controller 230.

FIG. 3 illustrates how the energy dissipated by the current-limiting transistor Q1 varies with the drain-source voltage during operation in the current-limiting mode in each of the types of conventional current-limiting circuit identified above. In all these cases, a single drive pulse is applied to the gate of the transistor, whose amplitude and duration are controlled by the controller 230 in the respective manner described above. During the application of the gate drive pulse, the voltage across the transistor Q1 in these examples varies over a range of values that is small in relation to the widths of voltage regions 1 and 2, and may be approximated as being constant. Similar plots can be obtained when this approximation is relaxed, where the energy dissipated is plotted as a function of values that are representative of $V_{DS}$ during current limitation, such as starting values of the drain-source voltage, $V_{DSi}$, or an average (e.g. mean or median) value of $V_{DS}$, for example.

As shown in FIG. 3, the first type (Type 1) of conventional current limiter discussed above applies current limitation and power limitation, and uses a fixed transistor ON time. Thus, at high values of $V_{DS}$, the controller 230 controls the gate of transistor Q1 to prevent the power dissipated in transistor Q1 from exceeding $P_{max}$, such that the energy dissipated (the "pulse energy") is not dependent on $V_{DS}$. At lower values of $V_{DS}$, the controller 230 controls the gate of transistor Q1 to prevent $I_{DS}$ from exceeding $I_{DSmax}$, thus causing the power dissipated to increase linearly with $V_{DS}$. Thus, the pulse energy curve for the Type 1 current limiter has a knee at $V_{DS}$ ~35 V.

In the case of the second type (Type 2) of conventional current limiter mentioned above, which applies current limitation (but not power limitation) with a transistor ON time that varies as $1/V_{DS}$, the energy dissipated by the transistor Q1 is not dependent on $V_{DS}$.

Furthermore, in the case of the third type of conventional current limiter (Type 3), which applies current limitation (but not power limitation) with a transistor ON time whose variation may be approximated as $A/(\max(V_{DS}-V', 0)+B)$, where V' is a fixed voltage value and A and B are constants, the pulse energy increases linearly with $V_{DS}$ for $V_{DS}$<V', and subsequently decreases with increasing $V_{DS}$, as shown in FIG. 3.

As can be appreciated from FIG. 3, for all three types of conventional current-limiting circuit discussed above, the energy dissipated by the transistor Q1 is not as high as it could be for all ranges of $V_{DS}$ that may be covered during current limitation (i.e. from any value of $V_{DSi}$ to a final drain-source voltage that appears across the transistor just before it is switched OFF), while remaining within the safe limits set by the MOSFET's pulse energy capability curve (labelled "MOSFET" in FIG. 3). Recognising this shortcoming of conventional current-limiting circuits, the present inventor has devised a current-limiting circuit that better exploits the transistor's energy dissipating potential for any range of $V_{DS}$ that might be covered during operation of the circuit in the current-limiting mode, in which the transistor's ON time as a function of $V_{DS}$ is better matched with the transistor's pulse energy capability curve. Plots of the pulse energy dissipated by the transistor in two embodiments of the present invention (described in detail below) are shown in FIG. 4, and are observed to match the transistor's pulse energy capability curve more closely than the plots shown in FIG. 3.

More specifically, the inventor has devised a current-limiting circuit comprising: a transistor connected between an input terminal of the current-limiting circuit and an output terminal of the current-limiting circuit; and a controller arranged to monitor a current flowing through the transistor and operable in a current-limiting mode to control the transistor based on the monitored current so as to limit the current flow, wherein a voltage dropped across the transistor varies over a range of values during operation in the current-limiting mode. The controller comprises a timing module arranged to control, based on a value of the voltage across the transistor during operation in the current-limiting mode, a period of time for which the transistor limits the current during operation in the current-limiting mode, wherein, for all ranges of voltage that may be dropped across the transistor during operation in the current-limiting mode, the timing module is arranged to control the respective period of time for each range such that the transistor dissipates substantially the maximum amount of energy that it is capable of dissipating without sustaining damage.

With knowledge of the transistor's pulse energy capability curve (which, as noted above, may be easily determined either experimentally or by examining the transistor's SOA diagram), those skilled in the art will recognise that the timing module may be configured in the manner set out above in many different ways. However, two advantageous implementations of the timing module are described, by way of example, in the following detailed description of embodiments.

There is also provided a method of configuring a current-limiting circuit, which comprises a transistor connected between an input terminal of the current-limiting circuit and an output terminal of the current-limiting circuit, and a controller arranged to monitor a current flowing through the transistor and operable in a current-limiting mode to control the transistor based on the monitored current so as to limit the current flow, wherein a voltage dropped across the transistor varies over a range of values during operation in the current-limiting mode. The method comprises determining, for all ranges of voltage that may be dropped across the transistor during operation in the current-limiting mode, a respective period of time for each range, for which period of time the transistor can limit the current while dissipating substantially the maximum amount of energy that it is capable of dissipating without sustaining damage. The method further comprises configuring the controller to control the transistor to limit the current during operation in the current-limiting mode such that, for all ranges of voltage that may be dropped across the transistor during operation in the current-limiting mode, the transistor is controlled to limit the current for the respective determined period of time in each of the voltage ranges.

BRIEF DESCRIPTION OF THE DRAWINGS

Embodiments of the invention will now be described, by way of example only, with reference to the accompanying drawings in which.

DETAILED DESCRIPTION OF EMBODIMENTS

[First Embodiment]

Figure 1:
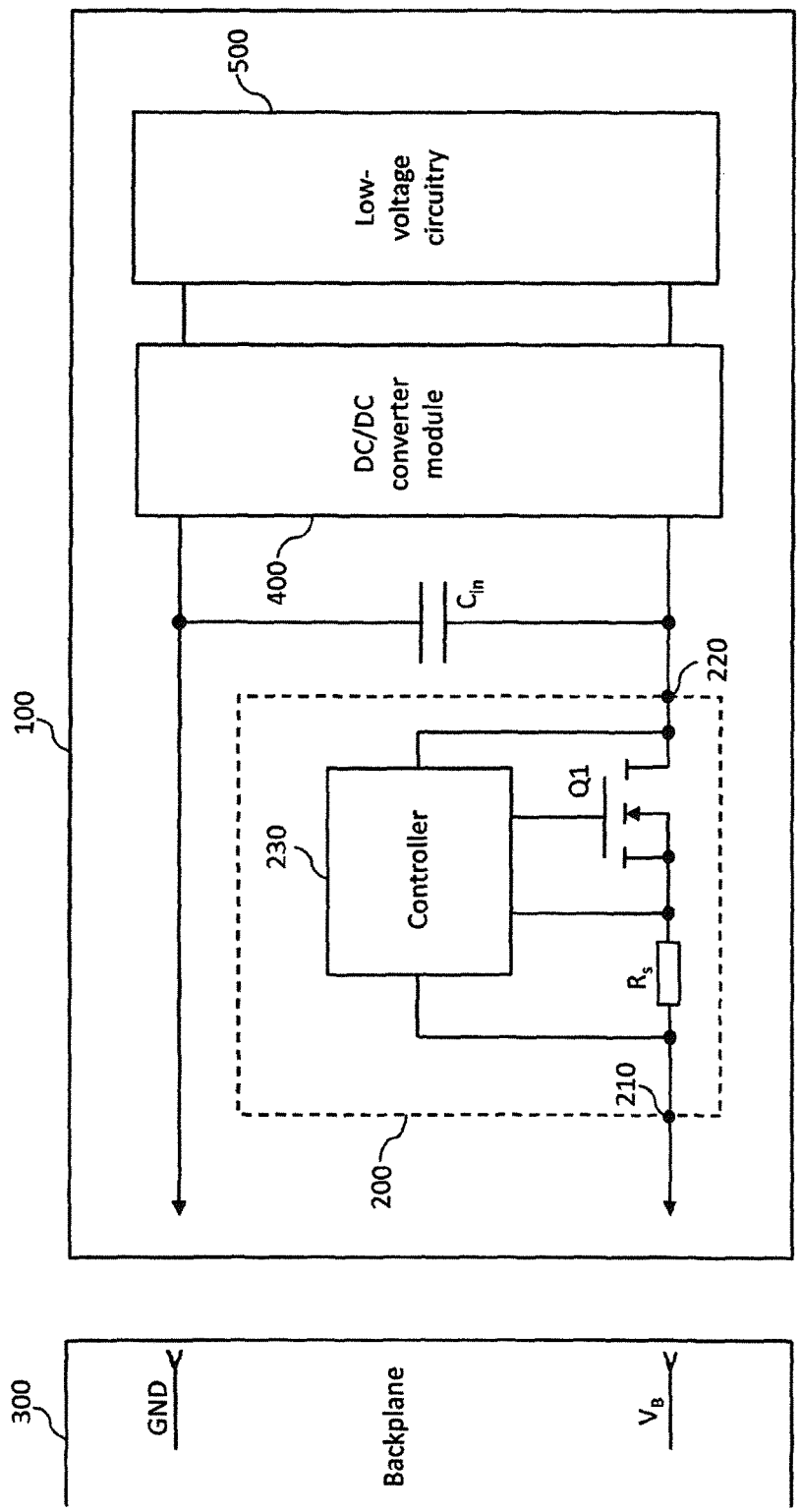
FIG. 1 shows an example of a conventional current-limiting circuit forming part of a plug-in integrated circuit board.
Figure 5:
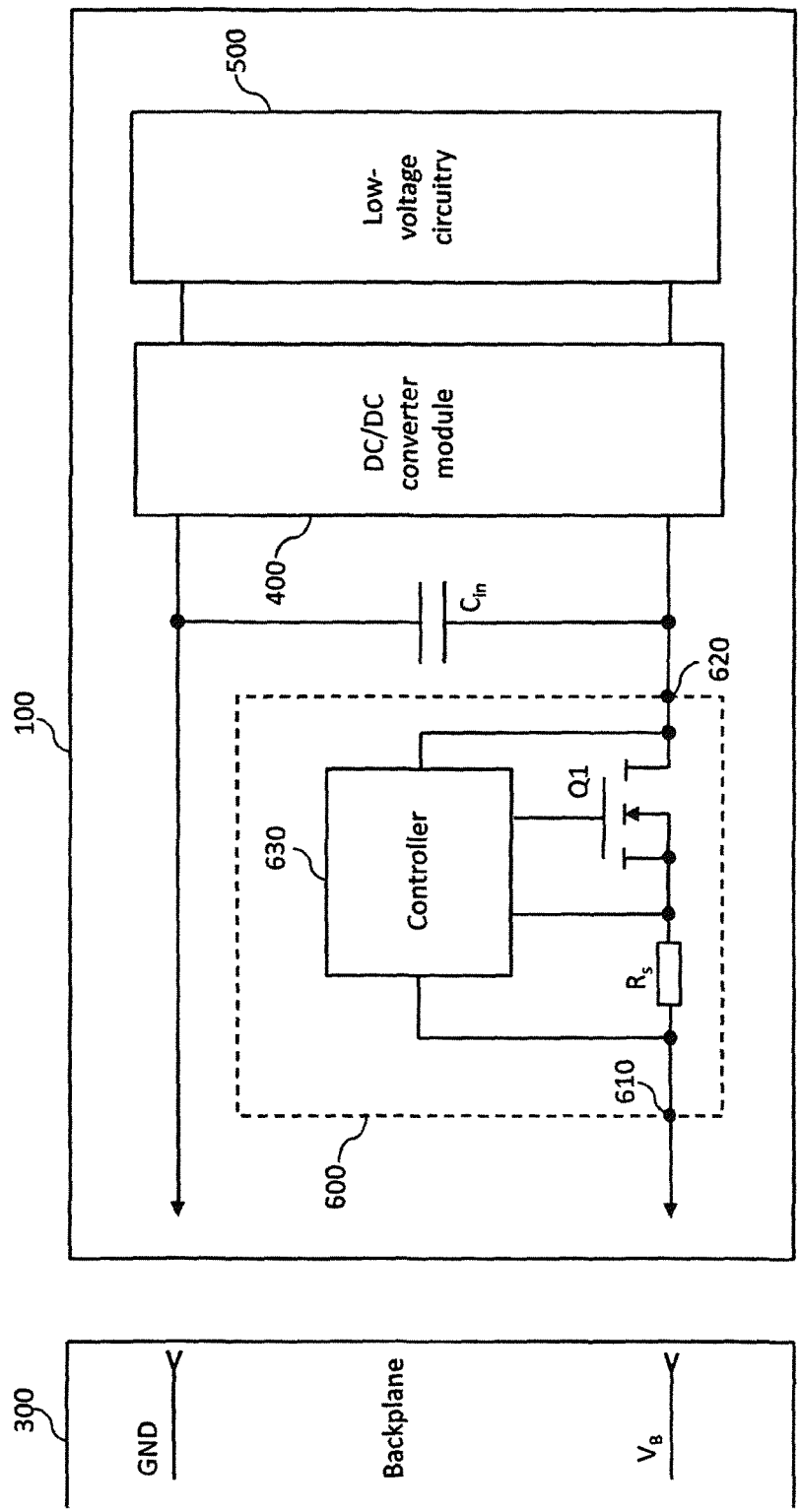
FIG. 5 shows a plug-in board having a current-limiting circuit according to an embodiment of the present invention.

FIG. 5 illustrates a current-limiting circuit 600 according to a first embodiment of the present invention, which, as in the background example of FIG. 1, is provided as part of a plug-in integrated circuit board 100 having a DC/DC converter module 400 and low-voltage circuitry 500 that are the same as those in FIG. 1. The description of these and other common components in FIGS. 1 and 5, which are labelled by like reference signs, will therefore not be repeated here. The following description will instead focus on the differences between the embodiments of the present invention and the background example of FIG. 1. It should be noted that a current-limiting circuit according to an embodiment of the present invention may be provided in a different kind of plug-in board than the one illustrated in FIG. 5, as part of the backplane circuitry, or as a stand-alone module that may be sold separately.

Figure 6:
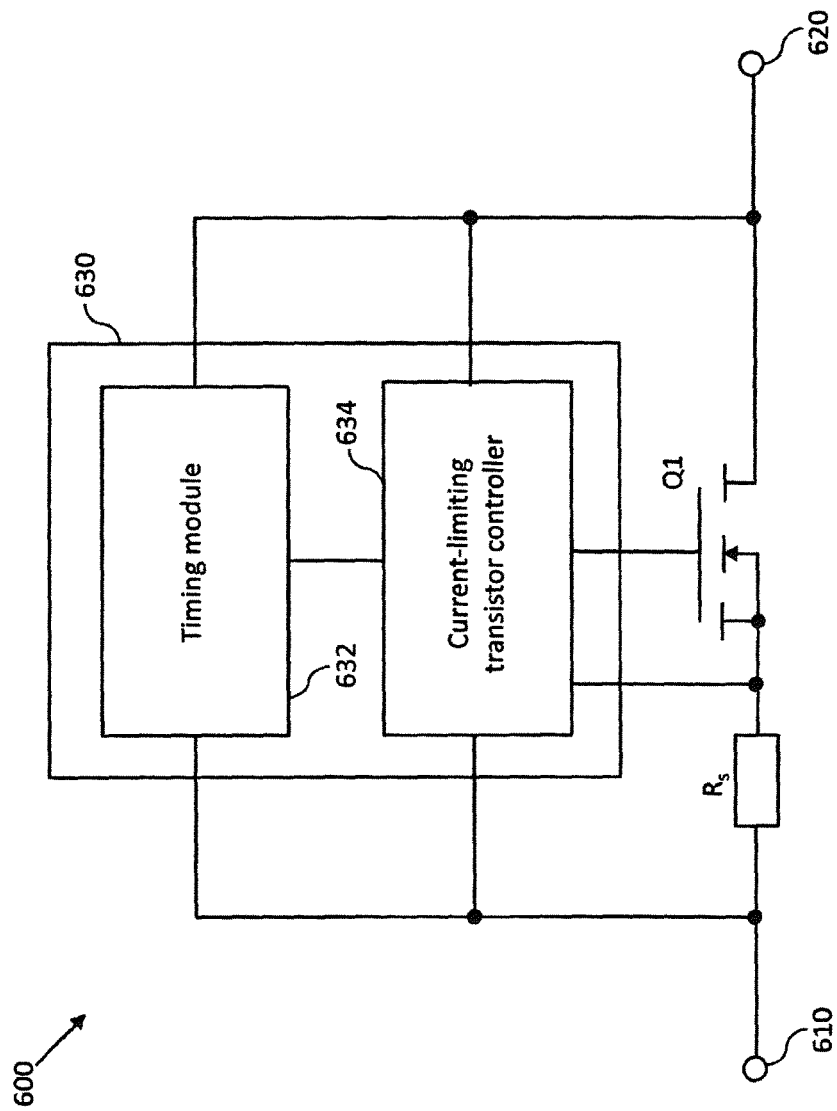
FIG. 6 shows details of the current-limiting circuit of a first embodiment of the present invention.

FIG. 6 is a schematic illustration of the current-limiting circuit 600 of the present embodiment, wherein the controller 630 comprises a timing module 632 and a current-limiting transistor controller 634. The timing module 632 is arranged to communicate with the current-limiting transistor controller 634 so as to control a period of time for which the transistor Q1 limits the transistor current $I_{DS}$ during operation of the controller 630 in the current-limiting mode. Moreover, the timing module 632 is configured to control, based on at least one value of the voltage dropped across the transistor Q1 during operation in the current-limiting mode, the transistor ON time such that, for all ranges of voltage $V_{DS}$ that may be dropped across the transistor Q1 during operation in the current-limiting mode, the respective period of time for each range is such that the transistor Q1 dissipates substantially the maximum amount of energy that it is capable of dissipating without sustaining damage.

In the present embodiment, the timing module 632 is arranged to sense the voltage across the series combination of the transistor Q1 and the current sense resistor $R_s$, which is essentially the same as the voltage drop across the transistor Q1 owing to the value of $R_s$ being much smaller than the MOSFET channel resistance for any gate voltage used during current limitation in the present embodiment. The timing module 632 may alternatively be arranged to determine the voltage across transistor Q1 alone. In both cases, the voltage sensed by the timing module 632 is indicative of $V_{DS}$ (in other words, provides a measure of $V_{DS}$).

The timing module 632 may be physically implemented in various different ways. The timing module 632 may, as in the present embodiment, rely on the charging of a capacitor for its control of the transistor's ON time ($t_{ON}$), and comprise a charging circuit arranged to charge the capacitor at a rate dependent on the voltage across the transistor Q1 during operation in the current-limiting mode, as well as a control signal generator that is arranged to generate a control signal to cause the controller to cease operating in the current-limiting mode when a voltage across the capacitor reaches a predetermined capacitor voltage threshold. In this case, the charging circuit is arranged to charge the capacitor such that the voltage across the capacitor reaches the predetermined capacitor voltage threshold in the period of time required for the transistor to dissipate substantially the maximum amount of energy that it is capable of dissipating without sustaining damage during operation in the current-limiting mode. A timing module of this kind may be implemented in various different ways, depending on how it is required to determine the transistor's ON time as a function of the voltage dropped across the transistor (Q1) during operation in the current-limiting mode. One example of such a timing module that is used in the present embodiment and has the advantage of being simple to fabricate with very few components, will be described in the following with reference to FIG. 7.

Figure 2:
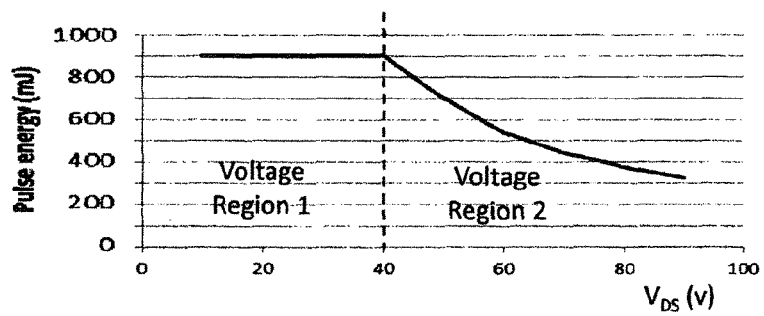
FIG. 2 illustrates the pulse energy capability of a typical MOSFET used in a current-limiting circuit.
Figure 3:
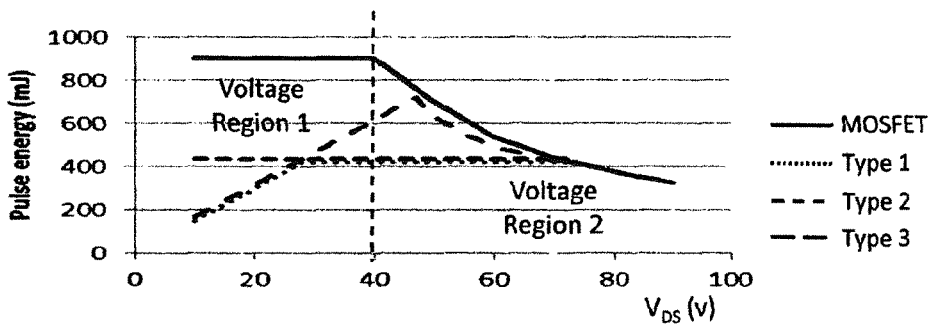
FIG. 3 illustrates the variations with drain-source voltage of the pulse energy dissipated by the MOSFET in cases where the MOSFET is controlled by different types of conventional current-limiting controller described herein, and also shows the MOSFET's pulse energy capability of FIG. 2, for comparison.
Figure 4:
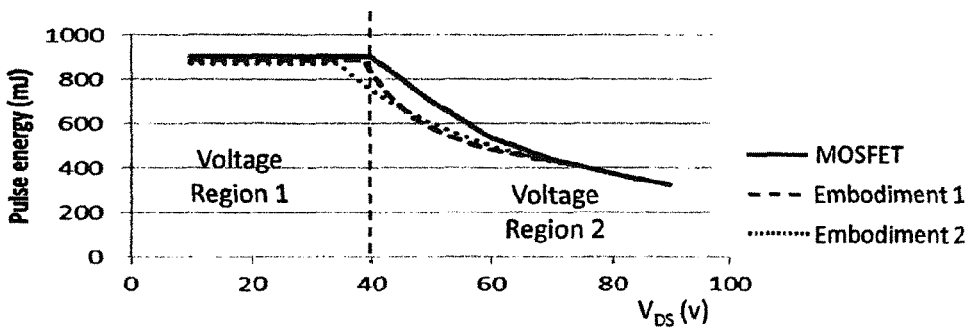
FIG. 4 illustrates the variations with drain-source voltage of the pulse energy dissipated by a MOSFET in embodiments of the present invention, and also shows the MOSFET's pulse energy capability of FIG. 2, for comparison.

In the present embodiment, the current-limiting transistor controller 634 is arranged to monitor $I_{DS}$ and is operable in the current-limiting mode to control the transistor Q1 based on the monitored current so as to limit the current flow through the transistor Q1, for the period of time controlled by the timing module 632. Thus, in contrast to the background example described above with reference to FIG. 1, the controller 630 of the present embodiment does not control the transistor Q1 to keep the power dissipated (i.e. the product $I_{DS} \cdot V_{DS}$) below a maximum permitted power, $P_{max}$.

Where the current-limiting transistor Q1 takes the form of a MOSFET, as in the present embodiment, or another type of transistor exhibiting similar pulse energy capability (e.g. an NPN transistor), then, owing to the shape of the pulse energy capability curve for these kinds of transistor, the timing module 632 is preferably configured to control the period of time for which the transistor Q1 limits the current during operation in the current-limiting mode such that, for ranges of $V_{DS}$ during operation in the current-limiting mode that lie below a threshold voltage, the respective periods of time are such that the transistor Q1 dissipates an amount of energy that is substantially the same for all of the ranges of voltage. Thus, the amount of energy dissipated for all values of $V_{DS}$ within the first voltage region shown in FIG. 2 is substantially the same as the maximum energy $E_{max}$ that the transistor Q1 is capable of dissipating without sustaining damage. Furthermore, for ranges of voltage across the transistor Q1 during operation in the current-limiting mode that lie above the threshold voltage (i.e. in the second region shown in FIG. 2), the respective periods of time are such that the amount of energy dissipated by the transistor Q1 decreases as the range of voltage departs further from the threshold voltage. In other words, for ranges of voltage across the transistor Q1 during operation in the current-limiting mode that lie above the threshold voltage, the timing module 632 is arranged to control the respective periods of time such that, the further a range of voltage is from the threshold voltage, the smaller the amount of energy dissipated by the transistor Q1. Thus, the amount of energy dissipated for all values of $V_{DS}$ within the second voltage region shown in FIG. 2 is also substantially the same as the maximum energy that the transistor Q1 is capable of dissipating without sustaining damage.

By configuring the timing module 632 to operate in this way, the transistor Q1 is controlled to conduct the inrush current for the maximum period of time that it can without sustaining damage, regardless of the voltage that is dropped across it. This allows the transistor Q1 to be used to its full potential, thereby achieving the advantages set out above.

In more detail, the timing module 632 may, as in the present embodiment, be arranged to control $t_{ON}$ to vary with $V_{DS}$ as follows:

$$t_{ON} = A/(B^*V_{DS} + C^*\max[V_{DS} - V_{TH}, 0]) + D, \qquad \text{Eqn. 1}$$

wherein $V_{TH}$ is the aforementioned threshold voltage (not to be confused with the MOSFET's gate threshold voltage), and A, B, C and D are constants (the constant offset D may be set equal to zero). The value of $V_{DS}$ in Eqn. 1 may, for example, be the initial value of $V_{DS}$ when the controller 630 starts operating in the current-limiting mode after detecting that the transistor current $I_{DS}$ exceeds the limit of $I_{DSmax}$. The values of A, B, C, D and $V_{TH}$ are such that, for all ranges of voltage that may be dropped across the transistor Q1 during operation in the current-limiting mode, the timing module 632 controls the respective period of time for each range such that the transistor Q1 dissipates substantially the maximum amount of energy that it is capable of dissipating without sustaining damage.

It is noted that the functional form of $t_{ON}(V_{DS})$ in Eqn. 1 is given by way of example only, and the timing module 632 may more generally control $t_{ON}$ in dependence on $V_{DS}$ in any other way such that, for all ranges of voltage $V_{DS}$ that may be dropped across the transistor Q1 during operation in the current-limiting mode, the respective period of time for each range is such that the transistor Q1 dissipates substantially the maximum amount of energy that it is capable of dissipating without sustaining damage. The form of $t_{ON}(V_{DS})$ given by Eqn. 1, however, has the advantage that it can be implemented in a simple timing module circuit having few components, as will now be explained.

Figure 7:
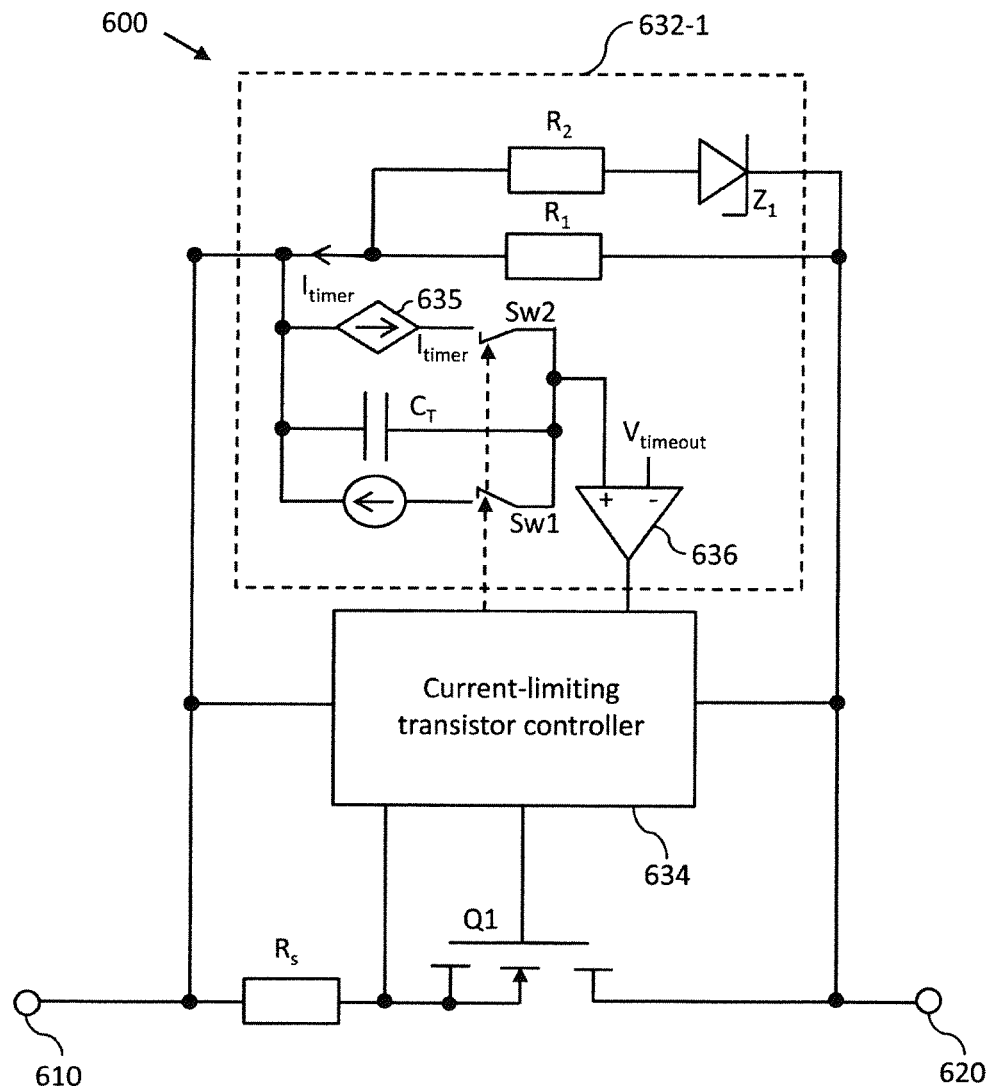
FIG. 7 shows details of the timing module in the current-limiting circuit of the first embodiment.

In the present embodiment, the timing module 632 takes the particularly simple form shown at 632-1 in FIG. 7, relying on the charging of a capacitor $C_T$ to control $t_{ON}$, as noted above. Owing to the form of $t_{ON}(V_{DS})$ in the present embodiment (Eqn. 1), the timing module can be implemented as a simple circuit, comprising a charging circuit having resistors $R_1$ and $R_2$, a zener diode $Z_1$, and a controlled current source 635. The charging current generated by the controlled current source 635 is equal to the sum of the currents flowing through resistors $R_1$ and $R_2$. In the present example, the charging circuit includes an op-amp circuit that works as a current mirror, sensing the current $I_{TIMER}$ through resistors $R_1$ and $R_2$ and charging the capacitor $C_T$ with this current.

By the above-described arrangement, the timing module is able to provide accurate timing even where $V_{DS}$ changes during current limitation. The charging circuit is arranged to charge the capacitor $C_T$ at a rate that is dependent on the voltage across transistor Q1 during operation in the current-limiting mode. The timing module 632-1 also includes a control signal generator in the exemplary form of a comparator 636, which is arranged to generate a control signal to cause the current-limiting transistor controller 634 to stop operating in the current-limiting mode when a voltage across the capacitor $C_T$ reaches a predetermined capacitor voltage threshold. The capacitor voltage threshold is determined by the reference voltage $V_{timeout}$ that is applied to one of the amplifier's inputs, as shown in FIG. 7.

The switch Sw1 is closed when the current-limiting transistor controller 634 is not operating in the current-limiting mode, and the switch Sw2 is open so that the capacitor $C_T$ cannot be charged. However, as soon as the current-limiting transistor controller 634 begins operating in the current-limiting mode, it generates switch control signals to open switch Sw1 and close switch Sw2 so as to allow the capacitor Cr to be charged by the controlled current source 635. Furthermore, once the voltage across the capacitor $C_T$ has reached the predetermined capacitor voltage threshold, switch Sw2 is opened and switch Sw1 is closed in order to reset (discharge) the capacitor $C_T$. The discharge of $C_T$ may not happen instantaneously and, in particular, the rate of the discharge may be arranged to decrease with the temperature of the transistor Q1. For instance, it may happen that the controller goes into current limiting mode but leaves current limiting mode before the predetermined capacitor voltage threshold has been reached. In this case, it may be preferable to slowly discharge the capacitor $C_T$ (e.g. using a controlled current limiter connected to switch Sw1, as shown in FIG. 7) so that, if the controller enters current limiting mode again, the charging will not start from 0 V but from a higher level; in this case, the predetermined capacitor voltage threshold will be reached in less time, thus safeguarding the transistor Q1.

In the present embodiment, the charging circuit is arranged to charge the capacitor $C_T$ such that the voltage across the capacitor $C_T$ reaches the predetermined capacitor voltage threshold in a period of time given by Eqn. 1 above. The required form of $t_{ON}(V_{DS})$ can be achieved by appropriately selecting the components in the charging circuit and the reference voltage $V_{timeout}$ applied to the comparator 636, as will now be explained.

The voltage $V_{CT}$ across the capacitor $C_T$ may be expressed as follows:

$$V_{CT} = \frac{1}{C_T} \int_0^{t_{ON}} \left( \frac{V_{DS}(t)}{R_2} + \frac{\max(V_{DS}(t) - V_{TH}, 0)}{R_1} \right) dt,$$

where $V_{TH}$ is the threshold voltage of the zener diode $Z_1$. The zener diode $Z_1$ only conducts when the voltage across it is greater than $V_{TH}$. For a fixed $V_{DS}$ (i.e. a $V_{DS}$ that does not vary with time), the primitive function can be calculated for the integral above as follows:

$$V_{CT} = \frac{1}{C_T} \int_0^{t_{ON}} \left( \frac{V_{DS}}{R_2} + \frac{\max(V_{DS} - V_{TH}, 0)}{R_1} \right) dt \Rightarrow V_{CT} =$$

$$\frac{1}{C_T} \left( \frac{V_{DS}}{R_2} + \frac{\max(V_{DS} - V_{TH}, 0)}{R_1} \right) t_{ON}$$

As $V_{CT}$ is equal to $V_{timeout}$ when the ON time has elapsed, $$V_{timeout} =$$

$$\frac{1}{C_T} \left( \frac{V_{DS}}{R_2} + \frac{\max(V_{DS} - V_{TH}, 0)}{R_1} \right) t_{ON} \Rightarrow t_{ON} = \frac{V_{timeout} C_T}{\frac{V_{DS}}{R_2} + \frac{\max(V_{DS} - V_{TH}, 0)}{R_1}}$$

Thus, in this example, the constants in Eqn. 1 are as follows: $A = V_{timeout} C_T$, $B = 1/R_2$, $C = 1/R_1$ and $D = 0$.

In the present example, the current limit to be enforced by the controller, $I_{LIM}$, is set at 15 A. The zener voltage, $V_{TH}$, of zener diode $Z_1$ should be chosen to be the same as the voltage at which the knee occurs in the pulse energy capability diagram. From FIG. 2, $V_{TH} = 40$ V, and the energy pulse capability in voltage region 1, $E_{VR1}$, is 900 mJ. When operating in voltage region 1, $V_{DS} * I_{LIM} * t_{ON} = E_{VR1}$. From the above, $$V_{timeout} = \frac{1}{C_T} \left( \frac{V_{DS}}{R_2} + \frac{\max(V_{DS} - V_{TH}, 0)}{R_1} \right) t_{ON} \quad \text{Eqn. 2}$$

As $V_{DS} < V_{TH}$ in voltage region 1, $$V_{timeout} = \frac{1}{C_T} \frac{V_{DS}}{R_2} t_{ON} \quad \text{Eqn. 3}$$

As $V_{DS} I_{LIM} t_{ON} = E_{VR1}$, it follows from Eqn. 3 that $V_{timeout}$ can be expressed as follows:

$$V_{timeout} = \frac{1}{C_T} \frac{V_{DS}}{R_2} \frac{E_{VR1}}{V_{DS} I_{LIM}} = \frac{1}{C_T} \frac{1}{R_2} \frac{E_{VR1}}{I_{LIM}}$$

Taking $V_{timeout} = 4$ V and $C_T = 10$ nF as typical values, $$V_{timeout} = \frac{1}{C_T} \frac{1}{R_2} \frac{E_{VR1}}{I_{LIM}} \Rightarrow R_2 = \frac{1}{C_T V_{timeout}} \frac{E_{VR1}}{I_{LIM}}$$

Using the above values for $C_T$, $V_{timeout}$, $E_{VR1}$ and $I_{LIM}$, $R_2$ is 1.5 MΩ. To determine $R_1$, the maximum permissible value of $V_{DS}$ (typically the maximum input voltage to the circuit) needs to be determined. In the present example, it is assumed that the maximum permissible value of $V_{DS}$, $V_{DSMAX}$, is 75 V. From FIG. 2, the corresponding maximum pulse energy, $E_{VDSMAX}$ (given by $V_{DSMAX} * I_{LIM} * t_{ON}$) is about 425 mJ. Evaluating Eqn. 2 at $V_{DS} = V_{DSMAX}$ leads to the following expression for $V_{timeout}$:

$$V_{timeout} = \frac{1}{C_T} \left( \frac{V_{DSMAX}}{R_2} + \frac{V_{DSMAX} - V_{TH}}{R_1} \right) t_{ON} \quad \text{Eqn. 4}$$

As $V_{DSMAX} I_{LIM} t_{ON} = E_{VDSMAX}$, the transistor ON time, $t_{ON}$, may be expressed as $E_{VDSMAX}/(V_{DSMAX} I_{LIM})$. Inserting this expression for $t_{ON}$ into Eqn. 4, the value of $R_1$ may be obtained as follows:

$$R_1 = \frac{V_{DSMAX} - V_{TH}}{V_{timeout} C_T \frac{V_{DSMAX} I_{LIM}}{E_{VDSMAX}} - \frac{V_{DSMAX}}{R_2}} \Rightarrow R_1 = 626 \text{ k}\Omega$$

Figure 8:
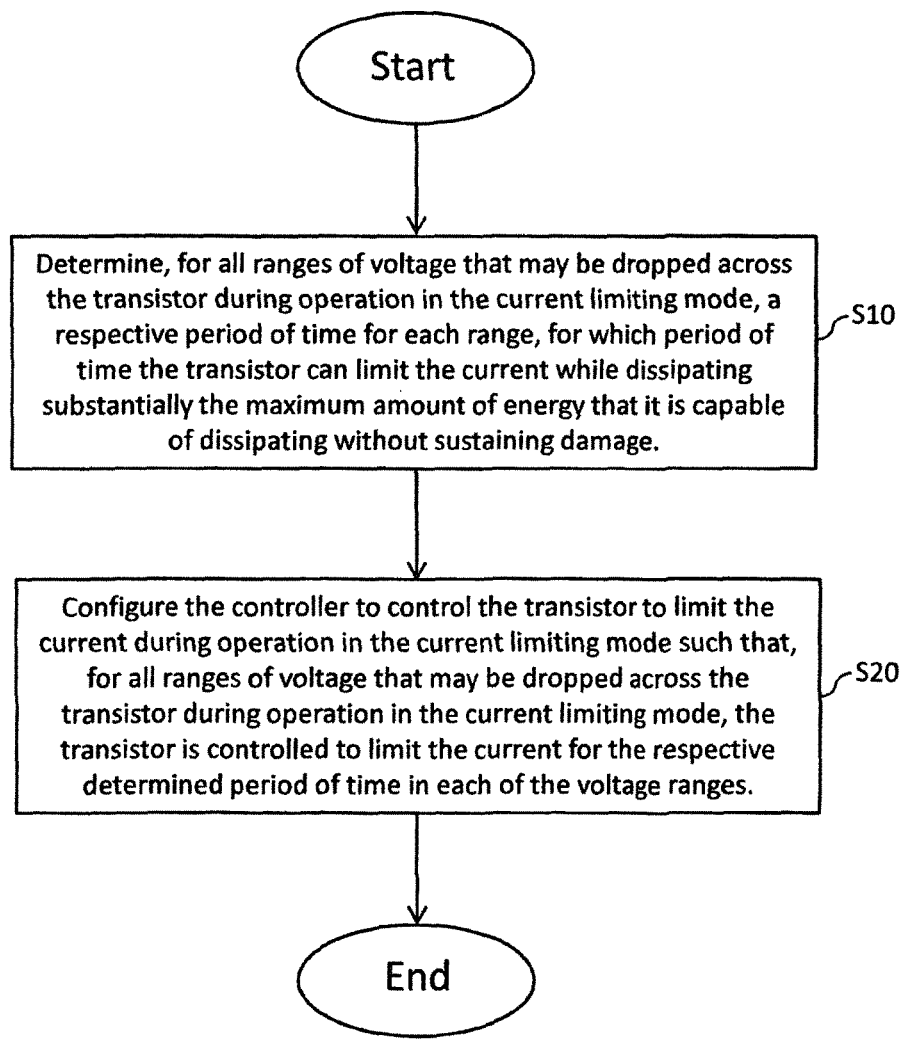
FIG. 8 illustrates a method of configuring a current limiting circuit according to the first embodiment.

The controller 630 of the present embodiment may be configured using a configuration method that will now be described with reference to FIG. 8.

In step S10, it is determined, for all ranges of voltage that may be dropped across the transistor Q1 during operation in the current-limiting mode, a respective period of time for each range, for which period of time the transistor Q1 can limit the current while dissipating substantially the maximum amount of energy that it is capable of dissipating without sustaining damage. This could be done, for example, by applying a plurality of input voltages $V_B$ to the plug-in board 100, and determining the maximum possible transistor ON time (i.e. the longest period of time for which the transistor Q1 can perform the current limitation without sustaining damage) for each of these input voltages. The transistor ON time for other values of the initially applied input voltage may be obtained by extrapolating between the experimentally determined values of the maximum ON time, if necessary or desirable.

In step S20, the controller 630 is configured to control the transistor Q1 to limit the current Ins during operation in the current-limiting mode such that, for all ranges of voltage that may be dropped across the transistor Q1 during operation in the current-limiting mode, the transistor Q1 is controlled to limit the current for the respective determined period of time in each of the voltage ranges. In the present embodiment, this can be done by appropriately selecting the components in the charging circuit and the reference voltage $V_{timeout}$ applied to the comparator 636 of timing module 632-1.

[Variant of the First Embodiment]

In the first embodiment of the invention described above, the timing module 632 is provided in the form of a simple circuit 632-1, which relies on the charging of a capacitor to determine $t_{ON}$. However, the timing module 632 may alternatively be implemented by appropriately configuring a digital signal processing apparatus to calculate $t_{ON}$ as a function of $V_{DS}$. Thus, the timing module 632 may alternatively comprise a calculator that is arranged to calculate, using a function of $V_{DS}$ during operation in the current-limiting mode and of one or more parameters, the period of time for which the transistor limits the current during operation in the current-limiting mode, as well as a control signal generator arranged to generate a control signal to cause the controller to cease operating in the current-limiting mode when the calculated period of time elapses. In this case, the one or more parameters are such that, for all ranges of voltage that may be dropped across the transistor during operation in the current-limiting mode, the timing module is arranged to control the respective period of time for each range such that the transistor dissipates substantially the maximum amount of energy that it is capable of dissipating without sustaining damage. A variant of the first embodiment that employs a timing module of this general kind will now be described with reference to FIGS. 9 and 10.

Figure 9:
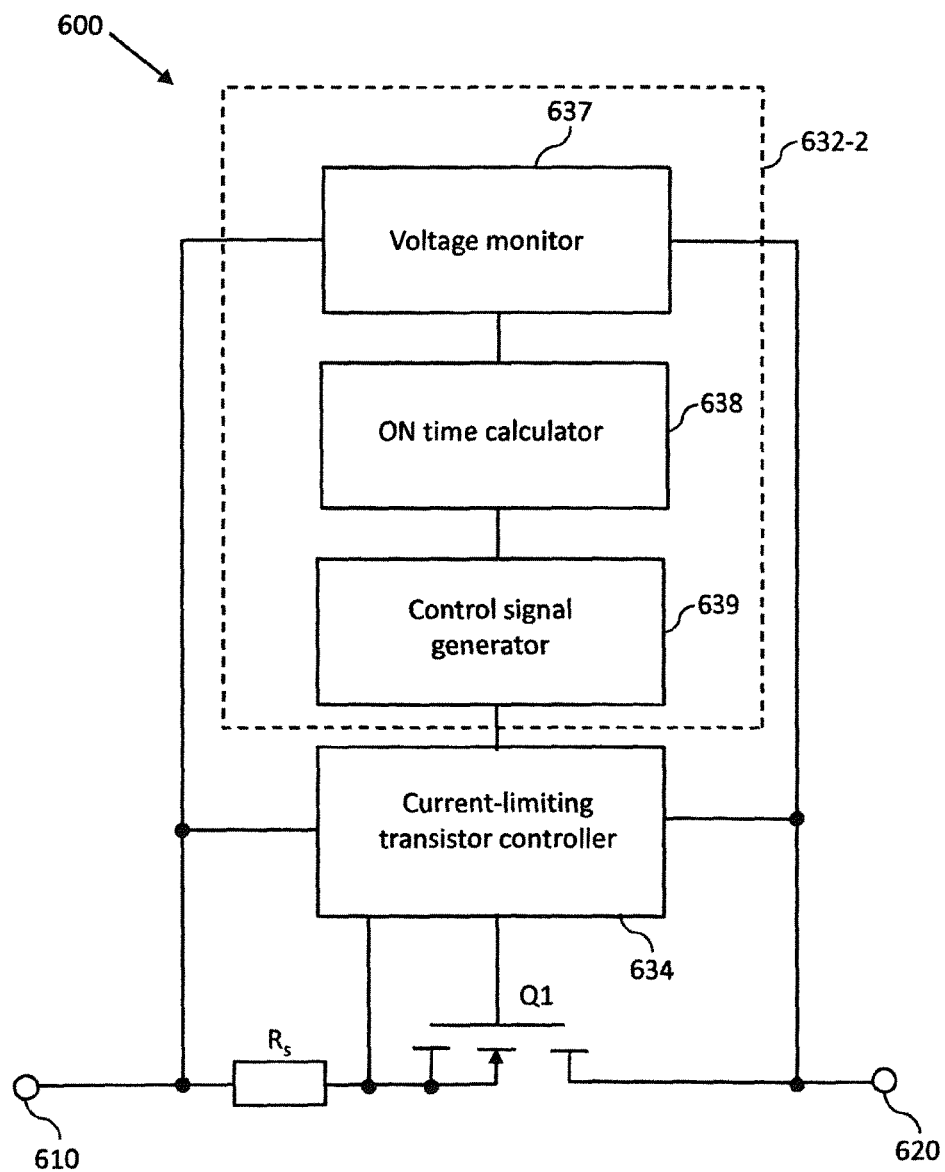
FIG. 9 shows a variant of the current-limiting circuit of the first embodiment, which controls the current-limiting transistor based on calculated values of the transistor ON time.

FIG. 9 shows a variant of the first embodiment, comprising a timing module 632-2 that has a voltage monitor 637, an ON time calculator 638, and a control signal generator 639, as well as other components that are the same as in the first embodiment and labelled with like reference signs. The voltage monitor 637 is arranged to monitor the voltage across the transistor Q1 and determine an initial value of the voltage, $V_{DSi}$, which is dropped across the transistor during operation in the current-limiting mode. This could be done by performing a measurement of $V_{DS}$ as soon as the controller begins current limitation, or by averaging two or more values of $V_{DS}$ that are measured in succession immediately after current limitation has begun. In this variant, the ON time calculator 638 is arranged to calculate the period of time ($t_{ON}$) for which the transistor Q1 limits the current during operation in the current-limiting mode according to Eqn. 1, using the determined value of $V_{DSi}$. As in the embodiment, the values of A, B, C, D and $V_{TH}$ are such that, for all ranges of voltage that may be dropped across the transistor Q1 during operation in the current-limiting mode, the timing module 632-2 controls the respective period of time for each range such that the transistor Q1 dissipates substantially the maximum amount of energy that it is capable of dissipating without sustaining damage.

Figure 10:
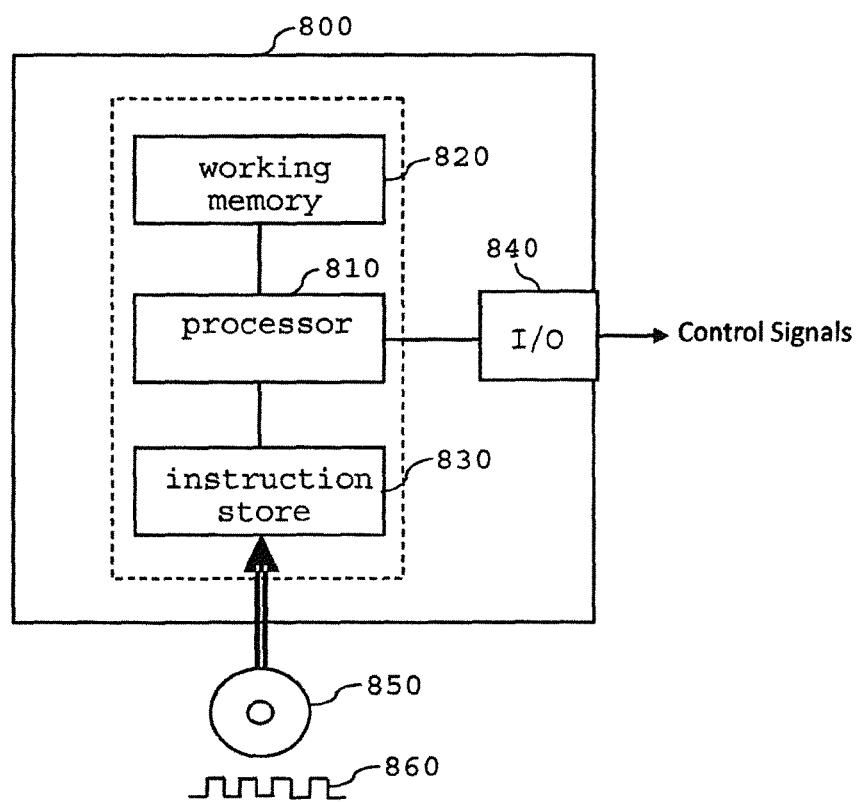
FIG. 10 is a schematic showing components of a programmable signal processing apparatus that can be configured to function as the timing module in the variant of the first embodiment.

The timing module 632-2 of the above-described variant of the first embodiment may, for example, be implemented in programmable signal processing apparatus 800 as shown in FIG. 10. The programmable signal processing apparatus 800 comprises a processor 810, a working memory 820 and an instruction store 830 storing computer-readable instructions which, when executed by the processor 810, cause the processor 810 to perform the above-described processing operations to generate control signals that cause the current-limiting transistor controller 634 to stop operating in the current-limiting mode. The instruction store 830 also stores the values of A, B, C, D and $V_{TH}$ that are used to calculate $t_{ON}$. The programmable signal processing apparatus 800 also includes an input/output (I/O) module 840 which operates to transmit the generated control signals to the current-limiting transistor controller 634. The instruction store 830 may comprise a ROM pre-loaded with the computer-readable instructions and parameter values. Alternatively, the instruction store 830 may comprise a RAM or similar type of memory, and the computer-readable instructions and parameters can be input thereto from a computer program product, such as a non-transitory computer-readable storage medium 850 such as a CD-ROM, etc. or a computer-readable signal 860 carrying the computer-readable instructions.

A method similar to that described above with reference to FIG. 8 may be used to configure the controller of this variant of the first embodiment. However, in this case, the controller 630 would be configured (in a step analogous to step S20 of FIG. 8) to control the transistor Q1 in the manner described above by selecting appropriate values of A, B, C, D and $V_{TH}$ (i.e. such that, for all ranges of voltage that may be dropped across the transistor during operation in the current-limiting mode, the controller 630 controls the respective period of time for each range such that the transistor dissipates substantially the maximum amount of energy that it is capable of dissipating without sustaining damage), and storing the selected values in the instruction store 830.

[Second Embodiment]

Figure 11:
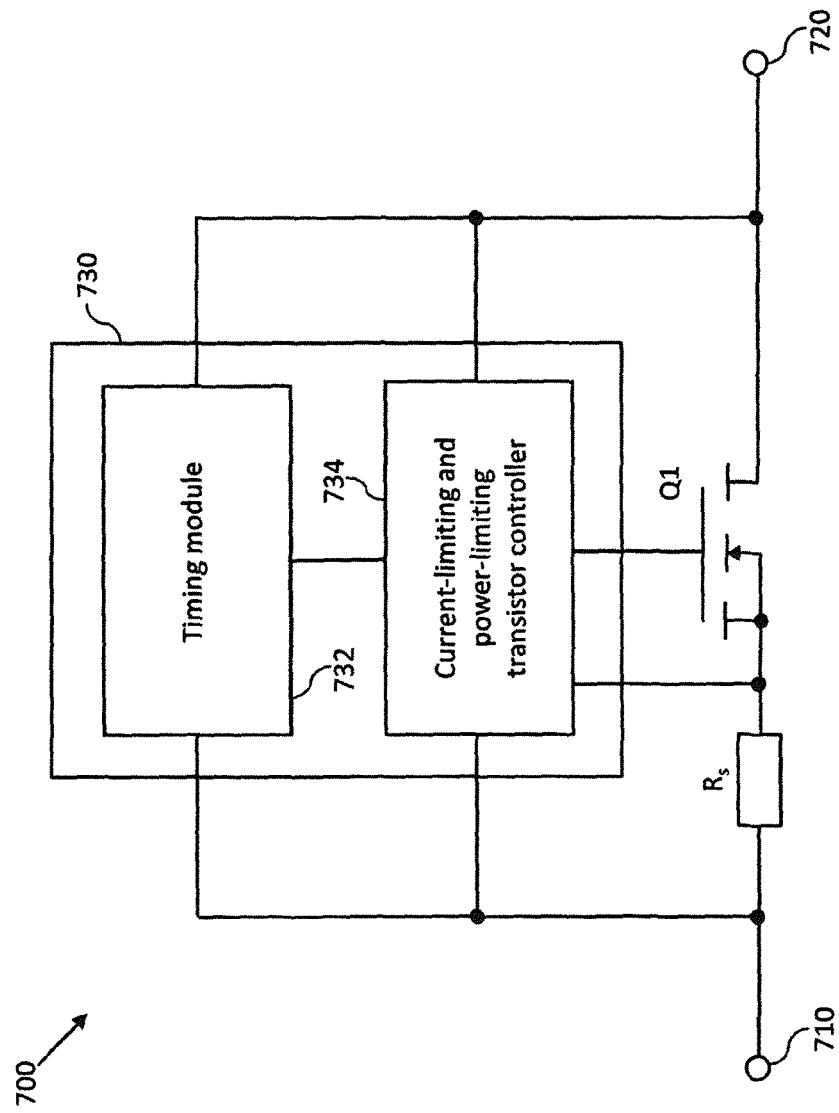
FIG. 11 illustrates a current-limiting circuit according to a second embodiment of the present invention.

A current-limiting circuit according to a second embodiment of the invention is illustrated in FIG. 11. The current-limiting circuit 700 of the present embodiment comprises a controller 730 having a timing module 732, and a current-limiting and power-limiting transistor controller 734.

The timing module 732 is arranged to communicate with controller 734 so as to control a period of time for which the transistor Q1 limits the transistor current $I_{DS}$ during operation of the controller 730 in the current-limiting mode. Moreover, the timing module 732 is configured to control, based on at least one value of the voltage dropped across the transistor Q1 during operation in the current-limiting mode, the transistor ON time such that, for all ranges of voltage $V_{DS}$ that may be dropped across the transistor Q1 during operation in the current-limiting mode, the respective period of time for each range is such that the transistor Q1 dissipates substantially the maximum amount of energy that it is capable of dissipating without sustaining damage.

As in the first embodiment, the timing module 732 is arranged to sense the voltage across the series combination of the transistor Q1 and the current sense resistor $R_s$, which is essentially the same as the voltage drop across the transistor Q1 owing to the value of $R_s$ being much smaller than the MOSFET channel resistance for any gate voltage used during current limitation in the present embodiment. The timing module 732 may alternatively be arranged to determine the voltage across transistor Q1 alone. In both cases, the voltage sensed by the timing module 732 is indicative of $V_{DS}$ (in other words, provides a measure of $V_{DS}$).

The timing module 732 may, as in the present embodiment, rely on the charging of a capacitor for its control of the transistor's ON time ($t_{ON}$), and comprise a charging circuit arranged to charge the capacitor at a rate dependent on the voltage across the transistor Q1 during operation in the current-limiting mode, as well as a control signal generator that is arranged to generate a control signal to cause the controller to cease operating in the current-limiting mode when a voltage across the capacitor reaches a predetermined capacitor voltage threshold. In this case, the charging circuit is arranged to charge the capacitor such that the voltage across the capacitor reaches the predetermined capacitor voltage threshold in the period of time required for the transistor to dissipate substantially the maximum amount of energy that it is capable of dissipating without sustaining damage during operation in the current-limiting mode. A timing module of this kind may be implemented in various different ways, depending on how it is required to determine the transistor's ON time as a function of the voltage dropped across the transistor Q1 during operation in the current-limiting mode. One example of such a timing module that is used in the present embodiment and has the advantage of being simple to fabricate with very few components, will be described in the following with reference to FIG. 12.

In the present embodiment, the current-limiting and power-limiting transistor controller 734 is arranged to monitor $I_{DS}$ and is operable in the current-limiting mode to control the transistor Q1 based on the monitored current so as to limit the current flow through the transistor Q1, for the period of time controlled by the timing module 732. In addition, the controller 734 is arranged to control the transistor Q1 to keep the power dissipated (i.e. the product $I_{DS} \cdot V_{DS}$) below a maximum permitted power, $P_{max}$. Thus, the controller 734 is operable in the current-limiting mode to control the transistor Q1 based on both the monitored current $I_{DS}$ and the monitored voltage $V_{DS}$ so as to limit both the current through the transistor Q1 and the power dissipated by the transistor Q1.

Where the current-limiting transistor Q1 takes the form of a MOSFET, as in the present embodiment, or another type of transistor exhibiting similar pulse energy capability, then, owing to the shape of the pulse energy capability curve for these kinds of transistor, the timing module 732 is preferably configured to control the period of time for which the transistor Q1 limits the current during operation in the current-limiting mode such that, for ranges of $V_{DS}$ during operation in the current-limiting mode that lie below a threshold voltage, the respective periods of time are such that the transistor Q1 dissipates an amount of energy that is substantially the same for all of the ranges of voltage. Thus, the amount of energy dissipated for all values of $V_{DS}$ within the first voltage region shown in FIG. 2 is substantially the same as the maximum energy $E_{max}$ that the transistor Q1 is capable of dissipating without sustaining damage. Furthermore, for ranges of voltage across the transistor Q1 during operation in the current-limiting mode that lie above the threshold voltage (i.e. in the second region shown in FIG. 2), the respective periods of time are such that, the further a range of voltage is from the threshold voltage, the smaller the amount of energy dissipated by the transistor Q1. Thus, the amount of energy dissipated for all values of $V_{DS}$ within the second voltage region shown in FIG. 2 is also substantially the same as the maximum energy that the transistor Q1 is capable of dissipating without sustaining damage. By configuring the timing module 732 to operate in this way, the transistor Q1 is controlled to conduct the inrush current for the maximum period of time that it can without sustaining damage, regardless of the voltage that is dropped across it. This allows the transistor Q1 to be used to its full potential, thereby achieving the advantages set out above.

In more detail, the timing module 732 may, as in the present embodiment, be arranged to control $t_{ON}$ to vary with $V_{DS}$ as follows:

$$t_{ON} = E/V_{DS} + F,\qquad\text{Eqn. 5}$$

wherein E and F are constants (the offset F may be set equal to zero). The value of $V_{DS}$ in Eqn. 5 may, for example, be the initial value of $V_{DS}$ when the controller 730 starts operating in the current-limiting mode after detecting that the transistor current $I_{DS}$ exceeds the limit of $I_{DSmax}$. The values of E and F are such that, for all ranges of voltage that may be dropped across the transistor Q1 during operation in the current-limiting mode, the timing module 732 controls the respective period of time for each range such that the transistor Q1 dissipates substantially the maximum amount of energy that it is capable of dissipating without sustaining damage.

Figure 12:
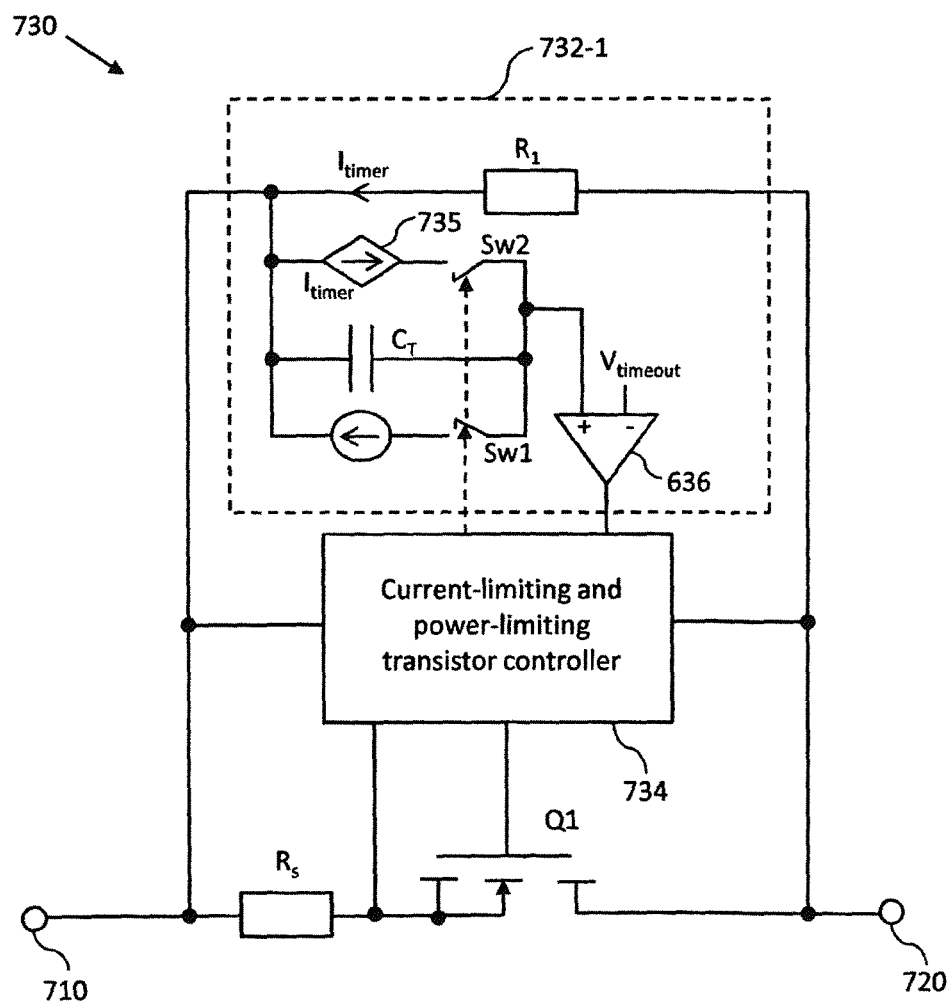
FIG. 12 shows details of the timing module in the current-limiting circuit of the second embodiment.

In the present embodiment, the timing module 732 takes the particularly simple form shown at 732-1 in FIG. 12, relying on the charging of a capacitor $C_T$ to control $t_{ON}$, as noted above. Owing to the form of $t_{ON}(V_{DS})$ in the present embodiment (Eqn. 5), the timing module can be implemented in a particularly simple circuit, comprising a charging circuit having a resistor $R_1$ and a controlled current source 735. The charging current generated by the controlled current source 735 is equal to the current $I_{TIMER}$ flowing through resistor $R_1$. In the present example, the charging circuit includes an op-amp circuit that works as a current mirror, sensing the current through resistor $R_1$ and charging the capacitor $C_T$ with this current.

By the above-described arrangement, the timing module is able to provide accurate timing even where $V_{DS}$ changes during current limitation. The charging circuit is arranged to charge the capacitor $C_T$ at a rate that is dependent on the voltage across transistor Q1 during operation in the current-limiting mode. The timing module 732-1 also includes a control signal generator in the exemplary form of a comparator 636, which is the same as in the first embodiment. The switches Sw1 and Sw2 are controlled by the current-limiting and power-limiting transistor controller 734 to operate in the same manner as in the first embodiment.

In the present embodiment, the charging circuit is arranged to charge the capacitor $C_T$ such that the voltage across the capacitor $C_T$ reaches the predetermined capacitor voltage threshold in a period of time given by Eqn. 5 above. The required form of $t_{ON}(V_{DS})$ can be achieved by appropriately selecting the components in the charging circuit and the reference voltage $V_{timeout}$ applied to the comparator 636, as will now be explained.

The voltage $V_{CT}$ across the capacitor $C_T$ may be expressed as follows:

$$V_{CT} = \frac{1}{C_T} \int_0^{t_{ON}} \frac{V_{DS}(t)}{R_1} dt$$

For a fixed $V_{DS}$ that does not vary with time during operation in the current limiting mode, the $V_{CT}$ can be expressed as follows:

$$V_{CT} = \frac{1}{C_T} \int_0^{t_{ON}} \frac{V_{DS}(t)}{R_1} dt = \frac{1}{C_T} \frac{V_{DS}}{R_1} t_{ON}$$

As $V_{CT}$ is equal to $V_{timeout}$ when the ON time has elapsed, $$V_{timeout} = \frac{1}{C_T} \frac{V_{DS}}{R_1} t_{ON} \Rightarrow t_{ON} = V_{timeout} C_T R_1 \frac{1}{V_{DS}}$$

Thus, in this example, $t_{ON}(V_{DS})$ takes the form of Eqn. 5, with $E = V_{timeout} C_T R_1$ and $F=0$.

In the present example, the current limit to be enforced by the current-limiting and power-limiting transistor controller 734, $I_{LIM}$, is set at 15 A. From FIG. 2, the pulse energy capability of the transistor Q1 in voltage region 1, $E_{VR1}$, is 900 mJ. When operating in voltage region 1, $V_{DS} * I_{LIM} * t_{ON} = E_{VR1}$, and we have $$t_{ON} = V_{timeout} C_T R_1 \frac{1}{V_{DS}}$$

$$V_{DS} I_{LIM} t_{ON} = E_{VR1} \Rightarrow t_{ON} = \frac{E_{VR1}}{V_{DS} I_{LIM}}$$

insert above $$\frac{E_{VR1}}{V_{DS} I_{LIM}} = V_{timeout} C_T R_1 \frac{1}{V_{DS}} \Rightarrow R_1 = \frac{E_{VR1}}{I_{LIM}} \frac{1}{V_{timeout} C_T} \Rightarrow R_1 = 1.5 \text{ M}\Omega$$

To determine the power limit, $P_{LIM}$, that is to be enforced by the current-limiting and power-limiting transistor controller 734, the maximum permissible $V_{DS}$ (typically the maximum input voltage to the circuit), $V_{DSMAX}$, is taken to be 75 V in the present example. FIG. 2 yields $E_{VDSMAX} = 425$ mJ. As $P_{LIM} * t_{ON} = E_{VDSMAX}$, and as $R_1$ has been determined, $P_{LIM}$ can be derived as follows:

$$t_{ON} = V_{timeout} C_T R_1 \frac{1}{V_{DSMAX}}$$

insert in $$P_{LIM} t_{ON} = E_{VDSMAX}$$

and we get $$P_{LIM} V_{timeout} C_T R_1 \frac{1}{V_{DSMAX}} =$$

$$E_{VDSMAX} \Rightarrow P_{LIM} = \frac{E_{VDSMAX} V_{DSMAX}}{V_{timeout} C_T R_1} \Rightarrow P_{LIM} = 531 \text{ W}$$

The controller 730 of the present embodiment may be configured using the configuration method that has been described above with reference to FIG. 8.

[Variant of the Second Embodiment]

In the second embodiment described above, the timing module 732 is provided in the form of a simple circuit 732-1, which relies on the charging of a capacitor to determine $t_{ON}$. However, the timing module 732 may alternatively be implemented by appropriately configuring a digital signal processing apparatus to calculate $t_{ON}$ as a function of $V_{DS}$. Thus, the timing module 732 may alternatively comprise a calculator that is arranged to calculate, using a function of $V_{DS}$ during operation in the current-limiting mode and of one or more parameters, the period of time for which the transistor limits the current during operation in the current-limiting mode, as well as a control signal generator arranged to generate a control signal to cause the controller to cease operating in the current-limiting mode when the calculated period of time elapses. In this case, the one or more parameters are such that, for all ranges of voltage that may be dropped across the transistor during operation in the current-limiting mode, the timing module is arranged to control the respective period of time for each range such that the transistor dissipates substantially the maximum amount of energy that it is capable of dissipating without sustaining damage.

Thus, a variant of the second embodiment may comprise a timing module having a voltage monitor and a control signal generator that are the same as those described above with reference to FIGS. 9 and 10. However, in contrast to the example of FIGS. 9 and 10, the ON time calculator of the present variant is arranged to calculate the period of time for which the transistor limits the current during operation in the current-limiting mode according to Eqn. 5.

The controller 730 of the present embodiment may be configured using a configuration method similar to that described above in connection with the variant of the first embodiment. However, in the present case, the controller 730 would be configured (in a step analogous to step S20 of FIG. 8) to control the transistor Q1 in the manner described above by selecting appropriate values of E and F (i.e. such that, for all ranges of voltage that may be dropped across the transistor during operation in the current-limiting mode, the controller 730 controls the respective period of time for each range such that the transistor dissipates substantially the maximum amount of energy that it is capable of dissipating without sustaining damage), and storing the selected values in the instruction store 830.

[Modifications]

Many modifications can be made to the embodiments, without departing from the scope of the present invention.

For example, the current-limiting circuits of the above embodiments and variants are configured to control the ON time of the current-limiting transistor to dissipate substantially the maximum amount of energy that it is capable of dissipating without sustaining damage at a given transistor temperature (e.g. 25° C.). These embodiments could, however, be modified to allow for near-optimal control of the transistor's ON time not only at a single temperature but over a range of temperatures in which the current-limiting circuit is to be used. Thus, the current-limiting circuit may further comprise a temperature sensor arranged to measure a temperature of the transistor Q1. In this case, for all ranges of voltage that may be dropped across the transistor Q1 during operation in the current-limiting mode, the controller would be arranged to control, based on the temperature measured by the temperature sensor, the respective period of time for each range such that the transistor dissipates substantially the maximum amount of energy that it is capable of dissipating without sustaining damage. For example, where the controller is implemented in the form of a digital signal processor (DSP) as in the above-described variants of the embodiments, the ON time calculator may store a respective set of one or more parameters for each of several different temperature ranges, and be arranged to select a set of parameter(s) for use in calculating $t_{ON}$ in dependence on the temperature measured by the temperature sensor.

Furthermore, although the digital signal processing apparatus of the above-described variants comprises an ON time calculator for calculating the period of time for which the transistor Q1 limits the current during operation in the current-limiting mode, the digital signal processing apparatus may alternatively be configured to mimic the operation of the timing module of the embodiments. More specifically, in a further variant, a microcontroller with an analog-to-digital converter (ADC) could be used to implement the control. The microcontroller may sample $V_{DS}$ via the ADC at regular interval. When operation in the current-limiting mode begins, the program run by the microcontroller could start accumulating values of a function $g(V_{DS})$:

$$C_{TIMEOUT} < \sum_{n=0}^{m} g(V_{DS})$$

When the accumulated value reaches a level $C_{TIMEOUT}$, the transistor Q1 is turned off. The weighting function g could be $A*V_{DS}+B*max(V_{DS}-V_{TH},0)$ in a variant of the first embodiment, yielding an on-time proportional to $1/(A*V_{DS}+B*max(V_{DS}-V_{TH}, 0))$. Alternatively, in a variant of the second embodiment, it could be a constant times $V_{DS}$, yielding an on-time proportional to $1/V_{DS}$. Any other function that matches the transistor's pulse capability curve (e.g. as shown in FIG. 2) could alternatively be used.

The foregoing description of embodiments of the present invention has been presented for the purpose of illustration and description. It is not intended to be exhaustive or to limit the invention to the present form disclosed. Alterations, modifications and variations can be made without departing from the spirit and scope of the present invention.

The invention claimed is:

1. A current-limiting circuit, comprising:
a transistor connected between an input terminal of the current-limiting circuit and an output terminal of the current-limiting circuit; and
a controller arranged to monitor a current flowing through the transistor and operable in a current-limiting mode to control the transistor based on the monitored current so as to limit the current, wherein a voltage dropped across the transistor varies over a range of values during operation in the current-limiting mode, the controller comprising:
a timing module arranged to control, based on a value of the voltage across the transistor during operation in the current-limiting mode, a period of time for which the transistor limits the current during operation in the current-limiting mode, wherein, for ranges of voltage across the transistor during operation in the current-limiting mode that lie below a threshold voltage, the timing module is arranged to control respective periods of time such that the transistor dissipates an amount of energy that is substantially the same for the ranges of voltage below the threshold voltage, and for ranges of voltage across the transistor during operation in the current-limiting mode that lie above the threshold voltage, the timing module is arranged to control respective periods of time such that, further a range of voltage is from the treshold voltage, the smaller the amount of energy dissipated by the transistor.

2. The current-limiting circuit according to claim 1, wherein the timing module is arranged to control the period of time for which the transistor limits the current during operation in the current-limiting mode to vary as $$A/(B*V_{DS}+C*max[V_{DS}-V_{TH},0]),$$

wherein $V_{DS}$ denotes the value of the voltage across the transistor during operation in the current-limiting mode, $V_{TH}$ is the threshold voltage and A, B and C are constants, the values of A, B, C and $V_{TH}$ being such that, for all ranges of voltage dropped across the transistor during operation in the current-limiting mode, the timing module is arranged to control the respective period of time for each range such that the transistor dissipates substantially the maximum amount of energy that it is capable of dissipating without sustaining damage.

3. The current-limiting circuit according to claim 1, further comprising:
a temperature sensor arranged to measure a temperature of the transistor, wherein, for all ranges of voltage dropped across the transistor during operation in the current-limiting mode, the controller is arranged to control, based on the temperature measured by the temperature sensor.

4. A current-limiting circuit comprising:
a transistor connected between an input terminal of the current-limiting circuit and an output terminal of the current-limiting circuit; and
a controller arranged to monitor a current flowing through the transistor and operable in a current-limiting mode to control the transistor based on the monitored current so as to limit the current, wherin a voltage dropped across the transistor varies over a range of values during operations in the current-limiting mode, the controller including a timing module arranged to control, based on a value of the voltage across the transistor during operations in the current-limiting mode, a period of time for which the transistor limits the current during operations in the current-limiting mode, the timing module comprising:
a capacitor;
a charging circuit arranged to charge the capacitor at a rate dependent on the voltage across the transistor during operation in the current-limiting mode; and
a control signal generator arranged to generate a control signal to cause the controller to cease operating in the current-limiting mode when a voltage across the capacitor reaches a predetermined capacitor voltage threshold,
wherein the charging circuit is arranged to charge the capacitor such that the voltage across the capacitor reaches the predetermined capacitor voltage threshold in the period of time required for the transistor to dissipate substantially the maximum amount of energy that it is capable of dissipating without sustaining damage during operation in the current-limiting mode.

5. The current-limiting circuit according to claim 4, wherein the charging circuit is arranged to charge the capacitor such that the voltage across the capacitor reaches the predetermined capacitor voltage threshold in a period of time given by $$A/(B*V_{DS}+C*max[V_{DS}-V_{TH},0])+D,$$

wherein $V_{DS}$ denotes the value of the voltage across the transistor during operation in the current-limiting mode, $V_{TH}$ is a threshold voltage that sets a threshold for $V_{DS}$ and A, B, C and D are constants, the values of A, B, C, D and $V_{TH}$ being such that, for all ranges of voltage dropped across the transistor during operation in the current-limiting mode, the timing module is arranged to control a respective period of time for each range such that the transistor dissipates substantially the maximum amount of energy that it is capable of dissipating without sustaining damage.

6. The current-limiting circuit according to claim 4, wherein:
the controller is further arranged to monitor the voltage across the transistor during operation in the current-limiting mode, and operable in the current-limiting mode to control the transistor based on both the moni-

19 tored current and the monitored voltage so as to limit both the current through the transistor and power dissipated by the transistor; and the charging circuit is arranged to charge the capacitor such that the voltage across the capacitor reaches the predetermined capacitor voltage threshold in a period of time given by $E/V_{DS}+F$, wherein $V_{DS}$ denotes the value of the voltage across the transistor during operation in the current-limiting mode, and E and F are constants, the values of E and F being such that, for all ranges of voltage dropped across the transistor during operation in the current-limiting mode, the timing module is arranged to control a respective period of time for each range such that the transistor dissipates substantially the maximum amount of energy that it is capable of dissipating without sustaining damage.

7. A current-limiting circuit comprising:

a transistor connected between an input terminal of the current-limiting circuit and an output terminal of the current-limiting cicuit; and a controller arranged to monitor a current flowing through the transistor and operable in a current-limiting mode to control the transistor based on the monitored current so as to limit the current, wherein a voltage dropped across the transistor varies over a range of values during operations in the current-limiting mode, the controller including a timing module arranged to control, based on a value of the voltage across the transistor during operations in the current-limiting mode, a period of time for which the transistor limits the current during operations in the current-limiting mode, the timing module comprising:

a calculator arranged to calculate, using a function of the voltage across the transistor during operation in the current-limiting mode and of one or more parameters, the period of time for which the transistor limits the current during operation in the current-limiting mode; and a control signal generator arranged to generate a control signal to cause the controller to cease operating in the current-limiting mode when the calculated period of time elapses, wherein the one or more parameters are such that, for all ranges of voltage dropped across the transistor during operation in the current-limiting mode, the timing module is arranged to control a respective period of time for each range such that the transistor dissipates substantially the maximum amount of energy that it is capable of dissipating without sustaining damage.

8. The current-limiting circuit according to claim 7, wherein the timing module further comprises:

a voltage monitor arranged to monitor the voltage dropped across the transistor and determine an initial value of the voltage, $VD_{DSi}$, that is dropped across the transistor during operation in the current-limiting mode, wherein the calculator is arranged to calculate the period of time for which the transistor limits the current during operation in the current-limiting mode as $A/(B*V_{DSi}+C*\max[V_{DSi}-V_{TH},0])+D$, wherein $V_{TH}$ is a threshold voltage that sets a threshold for the voltage dropped across the transistor and A, B, C

20 and D are constants, the values of A, B, C, D and $V_{TH}$ being such that, for all ranges of voltage dropped across the transistor during operation in the current-limiting mode, the timing module is arranged to control the respective period of time for each range such that the transistor dissipates substantially the maximum amount of energy that it is capable of dissipating without sustaining damage.

9. The current-limiting circuit according to claim 7, wherein:

the controller is further arranged to monitor the voltage across the transistor during operation in the current-limiting mode, and operable in the current-limiting mode to control the transistor based on both the monitored current and the monitored voltage so as to limit both the current through the transistor and power dissipated by the transistor;

the timing module further comprises a voltage monitor arranged to monitor the voltage dropped across the transistor and determine an initial value of the voltage, $V_{DSi}$, that is dropped across the transistor during operation in the current-limiting mode;

the calculator is arranged to calculate the period of time for which the transistor limits the current during operation in the current-limiting mode as $E/V_{DSi}+F$, wherein E and F are constants whose values are such that, for all ranges of voltage dropped across the transistor during operation in the current-limiting mode, the timing module is arranged to control the respective period of time for each range such that the transistor dissipates substantially the maximum amount of energy that it is capable of dissipating without sustaining damage.

10. A current-limiting circuit comprising:

a transistor connected between an input terminal of the current-limiting circuit and an output terminal of the current-limiting circuit; and a controller arranged to monitor a current flowing through the transistor and monitor a voltage across the transistor during operation in a current-limiting mode, and operable in the current-limiting mode to control the transistor based on both the monitored current and the monitored voltage so as to limit both the current through the transistor and power dissipated by the transistor, the controller including a timing module arranged to control a period of time for which the transistor limits the current during operation in the current-limiting mode to vary as $E/V_{DS}+F$, wherein $V_{DS}$ denotes the value of the voltage across the transistor during operation in the current-limiting mode, and E and F are constants, the values of E and F being such that, for all ranges of voltage dropped across the transistor during operation in the current-limiting mode, the timing module is arranged to control a respective period of time for each range such that the transistor dissipates substantially the maximum amount of energy that it is capable of dissipating without sustaining damage.

11. A method of configuring a current-limiting circuit comprising a transistor connected between an input terminal of the current-limiting circuit and an output terminal of the current-limiting circuit, and a controller arranged to monitor a current flowing through the transistor and operable in a current-limiting mode to control the transistor based on the monitored current so as to limit the current, wherein a voltage dropped across the transistor varies over a range of values during operation in the current-limiting mode, the method comprising:

determining, for all ranges of voltage dropped across the transistor during operation in the current-limiting mode, a respective period of time for each range, for which period of time the transistor can limit the current without sustaining damage; and configuring the controller to control the transistor to limit the current during operation in the current-limiting mode such that, for ranges of voltage across the transistor during operation in the current-limiting mode that lie below a threshold voltage, the respective periods of time are such that the transistor dissipates an amount of energy that is substantially the same for the ranges of voltage below the threshold voltage, and for ranges of voltage across the transistor during operations in the current-limiting mode that lie above the threshold voltage, the respective periods of time are such that the amount of energy dissipated by the transistor decreases as the range of voltage departs further from the threshold voltage.

12. The method according to claim 11, wherein the controller is configured to control the period of time for which the transistor limits the current during operation in the current-limiting mode to vary as $$A/(B*V_{DS}+C*\max[V_{DS}-V_{TH},0])+D,$$

wherein $V_{DS}$ denotes a value of the voltage across the transistor during operation in the current-limiting mode, $V_{TH}$ is the threshold voltage and A, B, C and D are constants, and the values of A, B, C, D and $V_{TH}$ are selected during configuration of the controller such that, for all ranges of voltage dropped across the transistor during operation in the current-limiting mode, the controller controls the respective period of time for each range such that the transistor dissipates substantially the maximum amount of energy that it is capable of dissipating without sustaining damage.

13. The method according to claim 11, wherein:

the controller is further arranged to monitor the voltage across the transistor during operation in the current-limiting mode, and operable in the current-limiting mode to control the transistor based on both the monitored current and the monitored voltage so as to limit the both the current through the transistor and power dissipated by the transistor; and configuring the controller to control the period of time for which the transistor limits the current during operation in the current-limiting mode to vary as $$E/V_{DS}+F,$$

wherein $V_DS$ denotes a value of the voltage across the transistor during operation in the current-limiting mode, and E and F are constants, and the values of E and F are selected during configuration of the controller such that, for all ranges of voltage dropped across the transistor during operation in the current-limiting mode, the controller controls the respective period of time for each range such that the transistor dissipates substantially the maximum amount of energy that it is capable of dissipating without sustaining damage.

* * * * *